Nov. 15, 1966  L. B. KYLE  3,284,948
CONTINUOUS HYDROPONIC SYSTEM
Filed Aug. 24, 1964  3 Sheets-Sheet 1
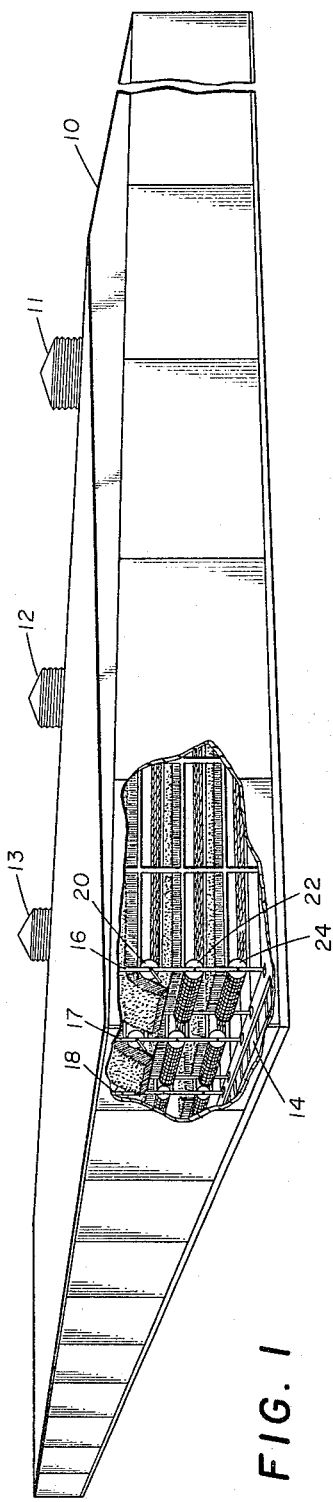
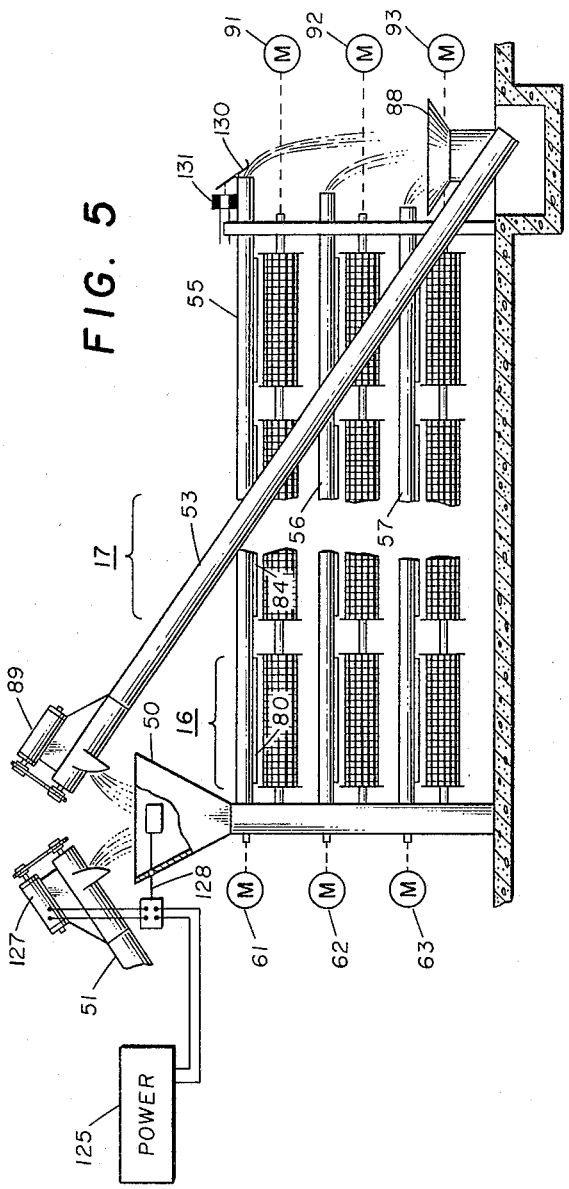
LESLIE B. KYLE
INVENTOR.
BY D. Carl Richards
ATTORNEY

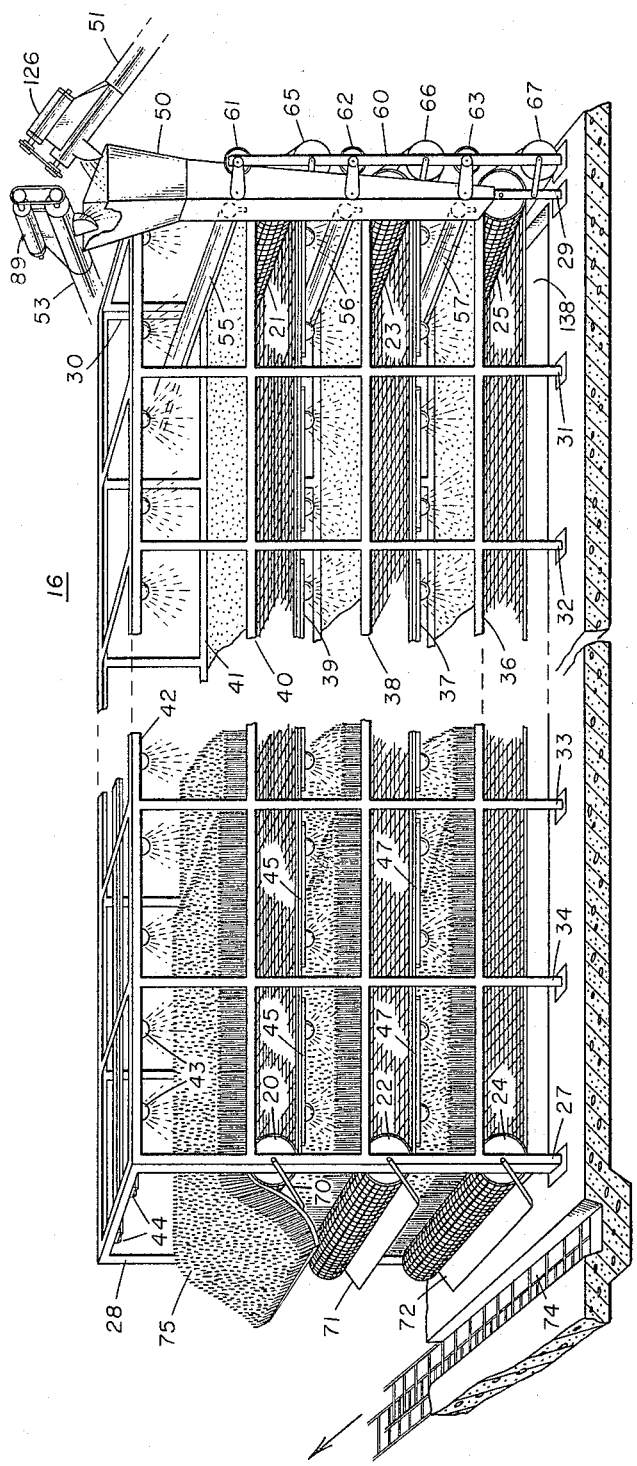
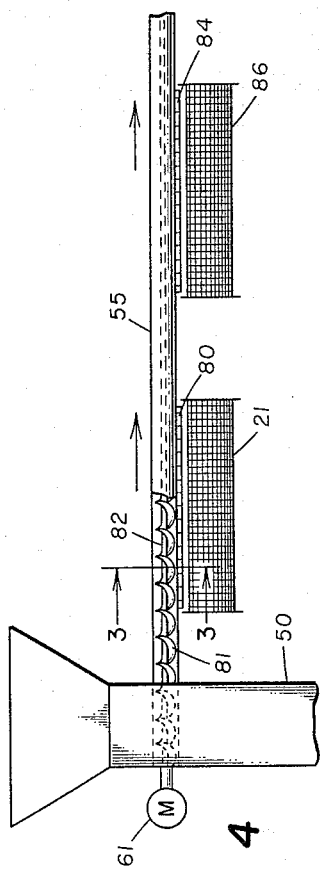
FIG. 2
FIG. 4
LESLIE B. KYLE
INVENTOR.
BY *D. Carl Richards*
ATTORNEY Nov. 15, 1966   L. B. KYLE   3,284,948
CONTINUOUS HYDROPONIC SYSTEM
Filed Aug. 24, 1964   3 Sheets-Sheet 3

LESLIE B. KYLE
INVENTOR.

BY D. Carl Richards

ATTORNEY

United States Patent Office 3,284,948
Patented Nov. 15, 1966

3,284,948
CONTINUOUS HYDROPONIC SYSTEM
Leslie B. Kyle, Indianapolis, Ind., assignor to Hydroponics, Inc., Indianapolis, Ind., a corporation of Indiana
Filed Aug. 24, 1964, Ser. No. 391,660
4 Claims. (Cl. 47—1.2)

This invention relates to hydroponic cultivation of plants wherein germination and growth are stimulated under a controlled nutrition soil-less environment, and more particularly to a system for the continuous production of green feed. In a further aspect, the invention relates to the maintenance of a multi-tiered multi-unit hydroponic system.

In U.S. Patent 2,971,290 a continuous seed bed operation is disclosed. The present case represents an improvement over the system disclosed in the above-identified patent and relates to the delivery of seed to and germination of seed in a multi-tiered, multi-unit system and the control of growth in the unit.

More particularly, in accordance with the invention, there is provided a system for operation in a controlled atmosphere which includes a plurality of flexible open mesh belts mounted in tiers, one above the other, with means to feed a continuous cellulose sheet over each of the flexible mesh structures. A seed hopper is provided adjacent to the input end of the belt. Means communicating with the hopper at a plurality of levels serve to deposit grain of uniform depth onto a sheet during movement of the belt. The seed bed placed on the sheet is then periodically soaked with a nutritional liquid as the belt moves the sheet continuously from the input end toward an output station. In a preferred form, the belt is segmented so that at the output station, the seed mat may be stripped therefrom in blocks.

In a further aspect, a plurality of tiered units are located side by side with common seed conveyers extending from a supply hopper to at least a pair of the side-by-side units, with a seed return from the output of the conveyers back to the hopper so that a continuous flow of seed in the conveyers will be maintained to assure uniform depth of the seed beds in each of the tiered units.

Figure 6:
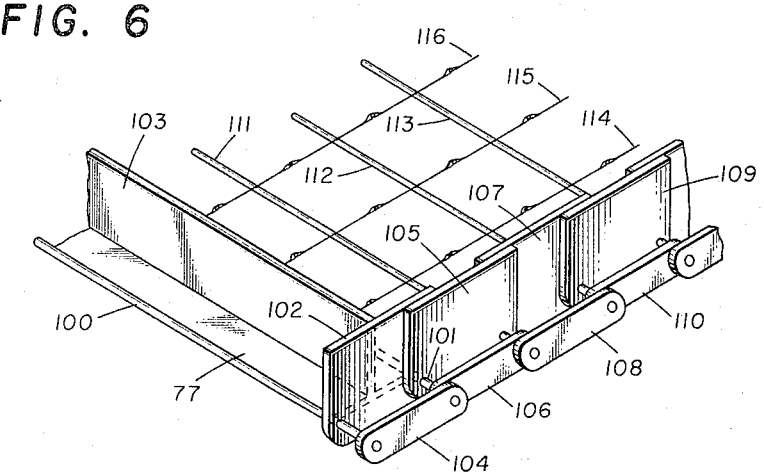
Figure 3:
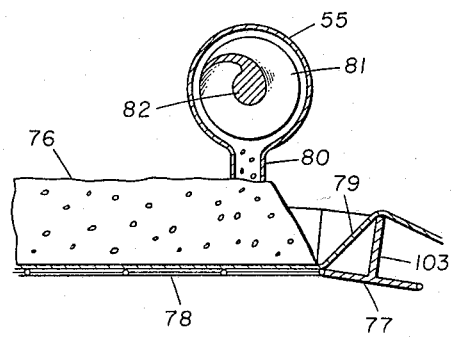
Figure 7:
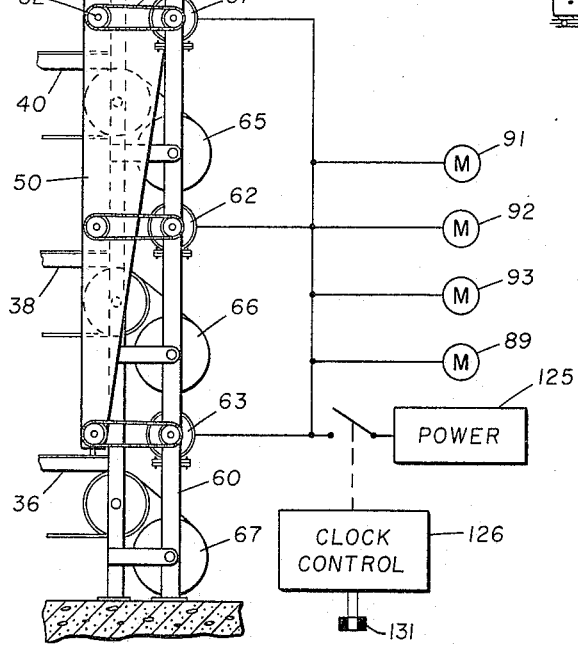

For a more complete understanding of the present invention and for further objects and advantages thereof, reference may now be had to the following description taken in conjunction with the accompanying drawings in which:

FIGURE 1 is a perspective view partially broken away to illustrate one embodiment of the invention;
FIGURE 2 is a broken view of one tiered unit;
FIGURE 3 is an enlarged sectional view of a seed conveyer and a portion of a seed bed;
FIGURE 4 is a side view of a seed conveyer;
FIGURE 5 is an end view of a multi-tier, multi-unit supply system;
FIGURE 6 is a detailed fragmentary view of the conveyer belt; and
FIGURE 7 is a side view of the supply hopper and associated mechanism.

Referring now to FIGURE 1, a hydroponic system is housed in a building 10 supplied with seed from storage bins 11–13 to deliver a continuous supply of green sprouts, together with a rooted mat of seeds to an output conveyer 14.

As shown in the broken-away portion of FIGURE 1, the building houses a plurality of multi-tiered production units 16, 17, and 18. The units are of like construction, unit 16 including three tiers generally identified by the location of the rollers 20, 22, and 24 at the output station of the tier 16. Each of the rollers serves to provide support for a flexible belt onto which a continuous layer of seeds is deposited at the input end. The belt travels slowly from the input to the output station during a predetermined growing season of the order of six or seven days. When a given segment of the belt reaches the output roller 20, the sprouted seeds are in the form of a lush nutritious green feed mass. At the output station the roots are stripped from the belt and the green feed mass falls from the production unit onto conveyer 14 which transports the product to a point of use or shipment for immediate consumption.

The multi-tiered producing unit 16 has been partially shown in FIGURE 2. Unit 16 includes a plurality of vertical and horizontal framing members which form an elongated, substantially open framework. The framework serves to support three sets of rollers which in turn support continuous belts on which seeds are deposited and on which a growth is ultimately obtained. The upper tier includes rollers 20 and 21. Roller 20 is mounted in the left end of the frame 16. Roller 21 is mounted at the right end of the frame 16. The second tier includes rollers 22 and 23. The third tier includes rollers 24 and 25.

The rollers 20, 22, and 24 are journaled in the end uprights 27 and 28. The rollers 21, 23, and 25 are journaled in the end uprights 29 and 30. Intermediate side supports, such as supports 31–34, serve together with companion supports on the opposite side to form a framework which is interconnected by longitudinal horizontal wires 36–42. The wires 36, 38, and 40 serve to provide vertical support to the belts on which the seed bed is placed. The wires 37, 39, and 42 provide support for a plurality of sprinklers, such as the sprinklers 43, and a plurality of lights such as the lights 44. Preferably the lights 44 are fluorescent lights which serve to provide stimuli to the seed beds. It will be noted that light units 45 are mounted on the wire 39 and light units 47 are mounted on the wire 37.

Adjacent to the input end is a supply hopper 50 which is maintained full of seed delivered by way of a conveyer 51. A return conveyer 43 also empties into the supply hopper 50. Three horizontally disposed seed conveyers 55–57 communicate with the hopper 51. The conveyer 55 is positioned above the roller 21. The conveyer 56 is positioned above the roller 23, and the conveyer 57 is positioned above the roller 25. Each of the conveyers 55–57 includes internal power-driven spiral screws which serve to deliver seed from the hopper 50 to the tiered units across which the conveyers extend. Screws in each of the conveyers force seed from the hopper into and through the conveyers. Adjacent to the hopper 50 is a support 60. Three motors 61, 62, and 63 are mounted on the support 60 and are coupled by a suitable drive belt to the screws in the conveyers 55–57.

Also supported by the support 60 are three rolls 65, 66, and 67 of a suitable perforated paper. The rolls of paper are fed automatically onto the belts passing over the rollers 21–25 to provide a support membrane on which seeds are deposited from the conveyers 55–57. The paper preferably is of the type described in Patent 2,971,290.

At the output station a set of stripping panels 70, 71, and 72 extend parallel to the rollers 20–24 respectively. The panels 70–72 are supported from the end members 27 and 28 by suitable brackets so that one edge of the stripper panel 70 is adjacent to the surface of the roller 20. One edge of the stripper panel 71 is adjacent to the roller 22 and an edge of the stripper panel 72 is adjacent to the surface of roller 24. Thus, as seed having a growth of roots and stems reaches the rollers at the output station, the seeds and the paper mat are lifted from the belt and travel downward onto a conveyer 74. Conveyer 74 extends laterally across the end of unit 16 and across other units adjacent thereto. As seen in FIGURE 2, a mat of sprouts, seeds and roots 75 issues from the upper belt as it passes over roller 20 and blade 70.

The upper conveyer 55 is shown in sectional view in FIGURE 3 together with part of a bed of seeds 76 and a short portion of the belt on which the seeds are located. The belt is also shown in FIGURE 6. The belt comprises a T-bar crosspiece 77. Similar bars are spaced at predetermined intervals along the length of each belt. The T-bars are interconnected by flexible wires 78, 114, 115, and 116, over which a paper layer or mat 79 is placed. The conveyer 55 has a downwardly extending spout section 80 through which seeds driven by a screw 81 on a shaft 82 may pass. The seeds will be deposited onto the paper at 79 to a depth dependent upon the elevation of the mouth of the spout 80 above the mat 79. The screw 82 is driven at constant speed so that the seeds will continuously move therethrough and provide a continuous feed supply.

As best seen in FIGURE 4, the spout 80 extends lengthwise of the conveyer 55 for registration with roller 21. Similarly, a second spout 84 extends from the conveyer 55 for registration with a belt on a roller 86 in the second tiered unit 17. Additional tiered units, such as unit 18, may also be supplied by the conveyer 55. For example, as shown in FIGURE 5, tiered units 16 and 17, as well as an additional number of tiered units, are supplied by conveyer 55 extending across the upper tier in each of the units. Conveyer 56 supplies the second tier in each of the units. Conveyer 57 supplies the lower tier in each of the units. The motors 61–63 may run continuously during any time interval that the conveyer belts are moving and the excess amounts of seed in the conveyers not delivered onto the belts are delivered into an overflow hopper 88. The return conveyer 53 extends from the overflow hopper 88 to deliver the excess seed back into the input hopper 50 under power of a motor 89.

In the embodiment shown in FIGURE 5 the paper rolls have been omitted to show the drums at the input end of the unit system coupled together by a common shaft and driven by motors 91–93. For example, motor 91 drives all of the drums on the top tiers. Motor 92 drives all of the drums on the middle tier an motor 93 drives all of the drums on the bottom tier.

FIGURE 6 illustrates a section of one form of a belt for support of the seed bed. One side of the belt together with one T-bar and a portion of an intermediate section of the belt are shown. More particularly, the T-bar 77 has a pair of rods secured along the edges of the flange, the rod 100 being shown along the left edge of the T-bar flange. The rod 101 extends along the right edge. The rods 100 and 101 serve as pins, as in a link belt. The belt link associated with the T-bar 77 includes a plate 102 which may be made integral with the bar 77. The rods 100 and 101 extend through holes therethrough.

The plate 102 is of height corresponding with the height of the web 103 of the T-bar 77. An outer link 104 also is fitted onto the rods 100 and 101. The next adjacent link includes a plate 105 and link 106. Plate 105 and link 106 are positioned inside the plate 102 and link 104. The next section of the belt includes a plate 107 and a link 108. The next succeeding section includes plates 109 and link 110. The belt may thus be constructed to form a continuous link belt which will work over a sprocket wheel in a manner well known in the art. It will be understood that the belt includes a similar sprocket chain on the other edge of the belt. The rods which serve as pivots for the links on the belt, namely rods 111, 112, and 113 along the rods 100 and 101, extend laterally across the entire width of the belt to provide pivots for the links on the opposite side. Longitudinal flexible wires, such as the wires 114, 115, and 116, are linked to the edge of the flange on T-bar 77 and extend to the next T-bar. As shown, the wires 114–116 are formed by short sections of flexible wire linked together intermediate each of the rods 111–113. With this construction, the belt may be mounted on sprockets driven by motors 91–93 of FIGURE 5. The rollers 20, 22, and 24 may then serve as idlers at the end opposite the drive end of the system. The rigid cross members, such as T-bar 77, serve to segment the seed bed. As shown in FIGURE 3, the paper liner which is supported by the rods 111–113 and the wires 114–116 provides a support for the seed bed in the manner taught by the above-identified patent. Preferably, the mat or membrane 79 is perforated to permit roots to pass therethrough. However, it has sufficient wet strength to support the growth above it on the grid formed by the rods 111–113 and the wires 114–116. As the paper mat membrane is rolled onto the belt, the weight of the seeds forces it down against the supporting grid, except where it passes upward and over the web 103 of the T-bar 77. Thus, as the growth reaches the output station, it will be permitted to fall from the traveling belt under the force of gravity in blocks, the length of which is dependent upon the spacing between the T-bars. For example, they may be spaced about two feet apart, the distance depending upon the length of blocks desired.

As shown in FIGURE 7, the paper rolls 65–67 are supported on suitable brackets extending from the support framework 60. The motor 61 is coupled by a sprocket chain 120 to the shaft 82 of the upper conveyer. Similarly, the motors 62 and 63 are coupled to drive the shafts in the conveyers 56 and 57 of FIGURE 2. Preferably, the longitudinal frame members 36, 38, and 40 are formed by angle bars which extend inwardly to within the span of the traveling belt and provide a supporting slideway on which the bottoms of the chains may ride. By this means the seed bed will be supported in a substantially level path as it travels through the growth traverse. The motors 61–63 are coupled to power source 125 by way of a switch under control of a clock 126. The drive motors for the belt 91–93 similarly are energized under such schedule as may be selected by an operator. Motor 89 on the feed return conveyer 53 also is powered under control of the clock 126. The motor 127, FIGURE 5, on the feed supply conveyer 51 is powered from source 125 by way of a seed supply-level control unit 128 stationed in the upper reaches of the hopper 50 and shown in the form of a float-operated mercury switch unit.

The system may be operated under the clock control 126 on an intermittent basis. Since the conveyers 55–57 are maintained full of grain at all times, the mouths of the conveyers leading to the respective belts may be stopped up by reason of swelling of the grain during the periods that the belts are not moving. In order to clear each of the conveyers of any stoppage, a gate, such as the gate 130, will be provided on the ends of each of the conveyers 55–57. The gate 130 is normally open and may be closed upon energization of a control solenoid 131. Solenoid 131 is actuated by the clock control 136 shown in FIGURE 7 and will be energized to close the gate 130 for a predetermined time interval following the application of power to the feed motors 61–63 and the drive motors 91–93.

By way of example, a unit capable of producing 60 tons of green feed per day would include 20 multi-tiered units. Each unit would be 96 feet long and 6 feet wide. Each unit would have three belts. The enclosure 10 preferably would be compartmented so that the first one-fourth of the traverse of each belt run would be maintained at about 85° F. The remaining portion would be maintained at a temperature of from 68° F. to 70° F. Grain would be deposited onto each belt approximately 1½ inches deep, which corresponds with about 100 pounds of seed grain for each six-by-twelve foot area. The belts are operated intermittently to remove about twelve feet of growth each day at the output station from each belt. Unloading one-half at the output and simultaneously loading at the input would require an hour operating interval per day. One hundred pounds of grain will yield about a thousand pounds of forage and grain in a seven-day growing interval.

As shown in FIGURE 2, a vat 138 is located beneath each multi-tiered unit. The nutrient-bearing fluid sprayed onto the belts in each unit flows by gravity down into the vat. The irrigation system has a suitable pump leading to the spray heads 43 with the pump input leading from the vat 138. The vat has a float connection leading to a water source so that make-up water may be supplied to the vat. Nutrient may be added to the water in accordance with various known criteria. A suitable plant nutrient may be such as manufactured and sold as Plant Nutrient 75-*a* by Hydroponics, Inc., Indianapolis, Indiana.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a hydroponic system where a covered open mesh culture belt is mounted for movement through an irrigated growing zone, the improvement which comprises:
   (a) a seed hopper at one end of said zone and adjacent to said belt,
   (b) a horizontal distribution screw communicating with said hopper and extending laterally above said belt at one end thereof and having structure to meter uniform deposits of grain onto said belt, and
   (c) means to energize said screw upon movement of said belt through said zone.

2. The combination set forth in claim 1 in which means are provided for increasing pressure on the grain in said screw for ejecting moist grain therefrom, when said metering structure is clogged therewith.

3. A tiered hydroponic system which comprises:
   (a) a plurality of flexible grain-supporting belts supported for movement over elongated paths one above the other,
   (b) a grain hopper at one side and at one end of said belts,
   (c) a plurality of feed screws communicating with said hopper and each extending laterally from said hopper above one of said belts, each said feed screw having a metering slot therein extending the width of the adjacent belt with the lips of said slot a predetermined distance from the belt surface and having a mouth directed downward toward said belt, and
   (d) means to energize each said screw when an adjacent belt is moved along its path.

4. The combination set forth in claim 3 in which said screw has unloading means therein for removing grain undergoing germination from the mouth thereof.

References Cited by the Examiner

UNITED STATES PATENTS 2,971,290   2/1961   Kyle _____ 47—1.2

ABRAHAM G. STONE, *Primary Examiner.*

R. E. BAGWILL, *Assistant Examiner.*